United States Patent
Okabe et al.

(10) Patent No.: US 8,657,123 B2
(45) Date of Patent: Feb. 25, 2014

(54) COMPOSITE SEMIPERMEABLE MEMBRANE AND MANUFACTURING METHOD THEREFOR

(75) Inventors: Jun Okabe, Otsu (JP); Hiroki Tomioka, Otsu (JP); Masahiro Henmi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 355 days.

(21) Appl. No.: 13/058,162

(22) PCT Filed: Sep. 11, 2009

(86) PCT No.: PCT/JP2009/065887
§ 371 (c)(1),
(2), (4) Date: Feb. 28, 2011

(87) PCT Pub. No.: WO2010/029985
PCT Pub. Date: Mar. 18, 2010

(65) Prior Publication Data
US 2011/0139708 A1    Jun. 16, 2011

(30) Foreign Application Priority Data
Sep. 12, 2008    (JP) .............................. 2008-234535

(51) Int. Cl.
*B01D 71/06* (2006.01)
*B01D 39/00* (2006.01)
*B01D 39/14* (2006.01)
*B01D 29/46* (2006.01)
*B29C 65/00* (2006.01)
*B01D 67/00* (2006.01)
*B05D 5/00* (2006.01)

(52) U.S. Cl.
USPC ................. 210/500.27; 210/500.35; 210/490; 264/41; 264/48; 427/244

(58) Field of Classification Search
USPC ................. 210/500.21, 500.27, 500.42, 490, 210/500.23; 427/244–245; 264/41, 48
See application file for complete search history.

(56) References Cited

U.S. PATENT DOCUMENTS

| 6,086,764 A | 7/2000 | Linder et al. |
| 7,641,054 B2* | 1/2010 | Sasaki et al. ................. 210/490 |
| 2003/0033931 A1* | 2/2003 | Sammons et al. ................ 95/45 |
| 2008/0148561 A1* | 6/2008 | Magera et al. .................. 29/852 |
| 2011/0139708 A1* | 6/2011 | Okabe et al. ............. 210/500.21 |

FOREIGN PATENT DOCUMENTS

| JP | 61-187904 A | 8/1986 |
| JP | 5-49879 A | 3/1993 |
| JP | 7-155571 A | 6/1995 |
| JP | 11-90195 A | 4/1999 |
| JP | 11-165052 A | 6/1999 |
| JP | 2000-24471 A | 1/2000 |
| JP | 2005-111429 A | 4/2005 |

OTHER PUBLICATIONS

Oral translation, JP 05-049879, 8/8/21991.*
Oral translation, JP 2000-024471, Jul. 9, 1998.*
Oral Translation JP3071170, 1986.*
JP5049879 (A), Pub. date Mar. 2, 1993, Machine translation.*
International Search Report, PCT/JP2009/065887, Dec. 22, 2009.

* cited by examiner

*Primary Examiner* — Ana Fortuna
(74) *Attorney, Agent, or Firm* — Birch, Stewart, Kolasch & Birch, LLP

(57) ABSTRACT

An object of the present invention is to provide a composite semipermeable membrane which has excellent chemical resistance, separation performance, and water permeability, and the composite semipermeable membrane has the following structure. The present invention provides a composite semipermeable membrane in which an separation function layer is formed on a microporous supporting membrane, wherein the separation function layer is formed from (A) a silicon compound in which a reactive group having an ethylenically unsaturated group and a hydrolyzable group are directly bonded to silicon atoms, and (B) a compound having an ethylenically unsaturated group other than the silicon compound, by condensation of the hydrolyzable group of the silicon compound (A) and polymerization of the ethylenically unsaturated group of the silicon compound (A) and the ethylenically unsaturated group of the compound (B) having the ethylenically unsaturated group.

8 Claims, No Drawings

COMPOSITE SEMIPERMEABLE MEMBRANE AND MANUFACTURING METHOD THEREFOR

TECHNICAL FIELD

The present invention relates to a composite semipermeable membrane which has excellent durability and water permeability and is preferable for water treatment, and a method for manufacturing the composite semipermeable membrane.

BACKGROUND ART

Conventionally, semipermeable membranes including a cellulose acetate membrane which has an asymmetric structure have been used as water-treatment separation membranes for blocking permeation of dissolved components such as salts (for example, Patent Document 1). However, this membrane has low hydrolysis resistance and microbial resistance, and is further insufficient in fundamental performance as a water-treatment separation membrane, such as salt rejection rate and water permeability. Therefore, the cellulose acetate membrane which has an asymmetric structure has not yet been put to practical use in a wide range of applications, while the membrane has been used for some applications.

In order to correct these defects, a composite semipermeable membrane, which has a microporous supporting membrane with a different material provided thereon to serve as a separation function layer for substantially providing membrane separation performance, has been proposed as a semipermeable membrane which differs from the membrane of the asymmetric structure in terms of configuration. In the case of the composite semipermeable membrane, it is possible to select an optimum material for each of the microporous supporting membrane and the separation function layer, and also a variety of methods can be selected for the membrane forming technique. Most of composite semipermeable membranes which have been commercially available so far have a separation function layer composed of a polyamide, which is obtained by interfacial polycondensation on a porous supporting membrane. Examples of such composite semipermeable membranes include the invention described in Patent Document 2. Furthermore, Patent Document 3 discloses a separation function membrane layer with the structure of a polyamide containing a silicon compound having an alkoxy group.

These composite semipermeable membranes described above provide higher desalination performance, and higher water permeability at the same time, than the cellulose acetate asymmetric membrane. However, such a composite semipermeable membrane using a polyamide has an amide linkage in its main chain, and thus still has insufficient resistance to oxidizing agents, and it is known that the desalination performance and selective separation performance are significantly degraded due to a treatment with chlorine, hydrogen peroxide, etc., for use in sterilization of the membrane.

In that regard, for example, Patent Document 4 and Patent Document 5 disclose a separation function layer obtained by polymerizing an ethylenically unsaturated compound, which has high general versatility for the membrane forming technique and has a wide range of selectivity for raw materials. However, while the composite semipermeable membrane produced with the use of the compound as described above has excellent chemical resistance, either water permeability or separation performance is insufficient.

PRIOR ART DOCUMENTS

Patent Documents

[Patent Document 1] U.S. Pat. No. 3,133,132
[Patent Document 2] U.S. Pat. No. 4,277,344
[Patent Document 3] Japanese Patent Application Laid-Open No. 9-99228
[Patent Document 4] Japanese Patent Application Laid-Open No. 2000-117077
[Patent Document 5] Japanese Patent Application Laid-Open No. 2004-17002

DISCLOSURE OF THE INVENTION

Problem To Be Solved By the Invention

Therefore, an object of the present invention is to obtain a composite semipermeable membrane which has high durability, high separation performance, and high water permeability.

Means For Solving the Problem

The present invention is achieved by the following aspects (1) to (5) for solving the problem described above.
(1) A composite semipermeable membrane with a separation function layer formed on a microporous supporting membrane, wherein the separation function layer is formed from
(A) a silicon compound in which a reactive group having an ethylenically unsaturated group and a hydrolyzable group are directly bonded to silicon atoms, and
(B) a compound having an ethylenically unsaturated group other than the silicon compound,
by condensation of the hydrolyzable group of the silicon compound (A) and polymerization of the ethylenically unsaturated group of the silicon compound (A) and the ethylenically unsaturated group of the compound (B) having the ethylenically unsaturated group.
(2) The composite semipermeable membrane according to (1), wherein the microporous supporting membrane has an average pore size of 1 to 100 nm.
(3) The composite semipermeable membrane according to (1) or (2), wherein the hydrolyzable group of the compound (A) is an alkoxy group, an alkenyloxy group, a carboxy group, a ketoxime group, a halogen atom, or an isocyanate group.
(4) The composite semipermeable membrane according to any of (1) to (3), wherein the silicon compound (A) is represented by the following general formula (a):

$$Si(R^1)_m(R^2)_n(R^3)_{4-m-n} \quad (a)$$

($R^1$ represents a reactive group including an ethylenically unsaturated group; $R^2$ is an alkoxy group, an alkenyloxy group, a carboxy group, a ketoxime group, a halogen atom, or an isocyanate group; $R^3$ represents a hydrogen atom or an alkyl group; m and n are integers, and $m+n \leq 4$, $m \geq 1$, and $n \geq 1$; and when two or more functional groups in each of $R^1$, $R^2$, and $R^3$ are bonded to a silicon atom, $R^1$, $R^2$, and $R^3$ may be the same or different).
(5) A method for manufacturing a composite semipermeable membrane with a separation function layer formed on a microporous supporting membrane, wherein the separation function layer is formed by applying (A) a silicon compound in which a reactive group having an ethylenically unsaturated group and a hydrolyzable group are directly bonded to silicon atoms, and (B) a compound having an ethylenically unsaturated group other than the silicon compound, and condensing the hydrolyzable group of the silicon compound (a) and polymerizing the ethylenically unsaturated group of the silicon compound (A) and the ethylenically unsaturated group of the compound (B) having the ethylenically unsaturated group.

Advantageous Effect of the Invention

According to the present invention, a composite semipermeable membrane can be provided which has excellent chemical resistance to chemicals typified by chlorine and water permeability. The industrial improvements of reduction in running cost, reduction in cost, and energy saving are expected through the use of this membrane.

BEST MODE FOR CARRYING OUT THE INVENTION

The microporous supporting membrane according to the present invention as a supporting membrane for the separation function layer provides the composite semipermeable membrane according to the present invention with strength. The separation function layer is provided on at least one side of the microporous supporting membrane. While a plurality of separation function layers may be provided, it is typically enough to provide one separation function layer on one side.

The microporous supporting membrane for use in the present invention preferably has a pore size in its surface within the range of 1 to 100 nm. The lower limit is preferably 5 nm, more preferably 10 nm, and the upper limit is preferably 50 nm.

When the microporous supporting membrane has a pore size in its surface within this range, the resulting composite semipermeable membrane has a high pure water permeability rate, and can maintain the structure without causing the separation function layer to fall into pores of the supporting membrane during operation under pressure.

In this case, the pore size of the microporous supporting membrane in its surface can be calculated from an electron micrograph. The pore size refers to a value obtained by taking a photograph and measuring and averaging the diameters of all of pores that can be observed. In the case of a noncircular pore, the pore size can be obtained in accordance with a method of obtaining a circle with its area equivalent to the area of the pore (equivalent circle) with the use of an image processing apparatus or the like, and determining the diameter of the equivalent circle as the diameter of the pore. As another means, the pore size can be obtained by differential scanning calorimetry (DSC). The details thereof are described in Ishikiriyama et al., "Journal of Colloid and Interface Science", 171, p. 103, Academic Press Inc. (1995).

The microporous supporting membrane preferably has a thickness within the range of 1 μm to 5 mm, more preferably within the range of 10 to 100 μm. A small thickness is more likely to decrease the strength of the microporous supporting membrane, thereby resulting in a tendency to decrease the strength of the composite semipermeable membrane. A large thickness makes it difficult to handle the microporous supporting membrane and the composite semipermeable membrane obtained from the microporous supporting membrane, for example, when the membranes are bent for use. In addition, in order to increase the strength of the composite semipermeable membrane, the microporous supporting membrane may be reinforced with cloth, nonwoven fabric, paper, etc. These reinforcement materials preferably have a thickness of 50 to 150 μm.

The material used for the microporous supporting membrane is not particularly limited. For example, homopolymers or copolymers of polysulfone, polyether sulfone, polyamide, polyester, cellulose-based polymers, vinyl-based polymers, polyphenylene sulfide, polyphenylene sulfide sulfone, polyphenylene sulfone, and polyphenylene oxide can be used. These polymers can be used singly or in combination. Among the polymers mentioned above, examples of the cellulose-based polymers include cellulose acetate and cellulose nitrate. Preferable examples of the vinyl-based polymers include polyethylene, polypropylene, polyvinyl chloride, and polyacrylonitrile. Above all, homopolymers or copolymers of polysulfone, polyether sulfone, polyamide, polyester, cellulose acetate, cellulose nitrate, polyvinyl chloride, polyacrylonitrile, polyphenylene sulfide, and polyphenylene sulfide sulfone are preferable. Furthermore, among these materials, it is particularly preferable to use polysulfone or polyether sulfone which has high chemical stability, mechanical stability, and thermal stability and is easy to mold.

The separation function layer in the composite semipermeable membrane according to the present invention preferably has a thickness within the range of 5 to 500 nm. The lower limit of the thickness is more preferably 5 nm. The upper limit of the thickness is more preferably 200 nm. The reduction in thickness is less likely to cause cracks, and can thus avoid the decrease in removal rate due to defects. Furthermore, the separation function layer with its thickness reduced can improve water permeability.

The separation function layer according to the present invention is formed on the microporous supporting membrane in accordance with the following reaction:

from (A) a silicon compound in which a reactive group having an ethylenically unsaturated group and a hydrolyzable group are directly bonded to silicon atoms, and (B) a compound having an ethylenically unsaturated group other than the silicon compound, by condensation of the hydrolyzable group of the silicon compound (A) and polymerization of the ethylenically unsaturated group of the silicon compound (A) and the ethylenically unsaturated group of the compound (B) having the ethylenically unsaturated group.

First, the silicon compound (A) will be described in which the reactive group having the ethylenically unsaturated group and the hydrolyzable group are directly bonded to silicon atoms.

The reactive group having the ethylenically unsaturated group is directly bonded to a silicon atom. Examples of this reactive group include a vinyl group, an allyl group, a methacryloxyethyl group, a methacryloxypropyl group, an acryloxyethyl group, an acryloxypropyl group, and a styryl group. In terms of polymerizability, a methacryloxypropyl group, an acryloxypropyl group, and a styryl group are preferable.

In addition, through the process such as change of the hydrolyzable group directly bonded to a silicon atom to a hydroxyl group, the condensation reaction takes place in which silicon compounds are bonded to each other by a siloxane linkage to produce a polymer. Examples of the hydrolyzable group include the following functional groups: an alkoxy group; an alkenyloxy group; a carboxy group; a ketoxime group; an aminohydroxy group; a halogen atom; and an isocyanate group. The alkoxy group has preferably 1 to 10 carbon atoms, and more preferably 1 to 2 carbon atoms. The alkenyloxy group has preferably 2 to 10 carbon atoms, more preferably 2 to 4 carbon atoms, and further preferably 3 atoms. The carboxy group has preferably 2 to 10 carbon atoms, and further preferably 2 carbon atoms, that is, the carboxy group is an acetoxy group. Examples of the ketoxime group include a methyl ethyl ketoxime group, a dimethyl ketoxime group, and a diethyl ketoxime group. The aminohydroxy group has an amino group bonded to a silicon atom with an oxygen atom interposed therebetween. Examples of the aminohydroxy group include a dimethyl aminohydroxy group, a diethyl aminohydroxy group, and a methylethyl aminohydroxy group. As the halogen atom, a chlorine atom is preferably used.

For the formation of the separation function layer, a silicon compound can also be used which has the hydrolyzable group partially hydrolyzed to provide a silanol structure. In addition, two or more silicon compounds can also be used which have the hydrolyzable group partially hydrolyzed and condensed to have a higher molecular weight to such an extent that no cross-linking is caused.

The silicon compound (A) is preferably represented by the following general formula (a).

$$Si(R^1)_m(R^2)_n(R^3)_{4-m-n} \quad (a)$$

($R^1$ represents a reactive group including an ethylenically unsaturated group. $R^2$ is an alkoxy group, an alkenyloxy group, a carboxy group, a ketoxime group, a halogen atom, or an isocyanate group. $R^3$ represents a hydrogen atom or an alkyl group. m and n are integers, and m+n≤4, m≥1, and n≥1. When two or more functional groups in each of $R^1$, $R^2$, and $R^3$ are bonded to a silicon atom, $R^1$, $R^2$, and $R^3$ may be the same or different.)

$R^1$ is a reactive group including an ethylenically unsaturated group, which is as described above.

$R^2$ is a hydrolyzable group, which is as described above. The alkyl group for $R^3$ has preferably 1 to 10 carbon atoms, and more preferably 1 to 2 carbon atoms. In addition, other functional groups may be bonded to the alkyl group.

As the hydrolyzable group, an alkoxy group is preferably used in terms of the viscosity of the reaction solution, for the formation of the separation function layer.

Examples of this silicon compound include vinyl trimethoxy silane, vinyl triethoxy silane, styryl trimethoxy silane, methacryloxypropylmethyldimethoxy silane, methacryloxypropyltrimethoxy silane, methacryloxypropylmethyldiethoxy silane, methacryloxypropyltriethoxy silane, and acryloxypropyltrimethoxy silane.

In addition to the silicon compound (A), another silicon compound can be used in combination, which has no reactive group having an ethylenically unsaturated group, but has a hydrolyzable group. Such a silicon compound may be a compound with m=0 in the general formula (a), although m is defined as "m≥1" in the general formula (a). Examples of the silicon compound with m=0 in the general formula (a) include tetramethoxy silane, tetraethoxy silane, methyltrimethoxy silane, and methyltriethoxy silane.

Next, the compound (B) having the ethylenically unsaturated group will be described, which is other than the silicon compound (A).

The ethylenically unsaturated group is addition-polymerizable. Examples of such a compound include ethylene, propylene, methacrylic acid, acrylic acid, styrene and derivatives thereof.

In addition, this compound is preferably an alkali-soluble compound having an acid group, in order to improve the selective water permeability and increase the salt rejection rate when the composite semipermeable membrane is used for the separation of an aqueous solution.

Preferable structures of the acid include carboxylic acid, phosphonic acid, phosphoric acid, and sulfonic acid, and these acid structures may be present in any form of an acid, an ester compound, and a metal salt. Compounds having one or more of these ethylenically unsaturated groups can contain two or more acids, and above all, compounds containing one to two acid groups are preferable.

Examples of compounds having a carboxylic acid group among the compounds having one or more ethylenically unsaturated groups mentioned above include the following compounds: maleic acid, maleic anhydride, acrylic acid, methacrylic acid, 2-(hydroxymethyl)acrylic acid, 4-(meth)acryloyloxyethyl trimellitic acid and corresponding anhydrides, 10-methacryloyloxydecyl malonic acid, N-(2-hydroxy-3-methacryloyloxypropyl)-N-phenylglycine, and 4-vinyl benzoic acid.

Examples of the compounds having a phosphonic acid group among the compounds having one or more ethylenically unsaturated groups mentioned above include vinylphosphonic acid, 4-vinylphenylphosphonic acid, 4-vinylbenzylphosphonic acid, 2-methacryloyloxyethylphosphonic acid, 2-methacrylamideethyl phosphonic acid, 4-methacrylamide-4-methyl-phenyl-phosphonic acid, 2-[4-(dihydroxyphosphoryl)-2-oxa-butyl]-acrylic acid, and 2-[2-(dihydroxyphosphoryl)-ethoxymethyl]-acrylic acid-2,4,6-trimethylphenylester.

Examples of the phosphate compounds among the compounds having one or more ethylenically unsaturated groups mentioned above include 2-methacryloyloxypropyl monohydrogenphosphate and 2-methacryloyloxypropyl dihydrogenphosphate, 2-methacryloyloxyethyl monohydrogenphosphate and 2-methacryloyloxyethyl dihydrogenphosphate, 2-methacryloyloxyethyl-phenyl-monohydrogenphosphate, dipentaerythritol-pentamethacryloyloxyphosphate, 10-methacryloyloxydecyl-dihydrogenphosphate, dipentaerythritol pentamethacryloyloxyphosphate, phosphoric acid mono-(1-acryloyl-piperidine-4-yl)-ester, 6-(methacrylamide)hexyl dihydrogenphosphate, and 1,3-bis-(N-acryloyl-N-propyl-amino)-propane-2-yl-dihydrogenphosphate.

Examples of the compounds having a sulfonic acid group among the compounds having one or more ethylenically unsaturated groups mentioned above include vinyl sulfonic acid, 4-vinylphenyl sulfonic acid, and 3-(methacrylamide) propyl sulfonic acid.

For the composite semipermeable membrane of the present invention, a reaction solution containing a compound having one or more ethylenically unsaturated groups and a polymerization initiator is used besides the silicon compound (A) in order to form the separation function layer. It is necessary to apply this reaction solution onto a porous membrane, further condense the hydrolyzable group, and additionally polymerize the ethylenically unsaturated groups, thereby providing these compounds with a higher molecular weight. When the silicon compound (A) is condensed singly, the linking of cross-linked chains will be concentrated on silicon atoms to increase the density difference between the part around silicon atoms and the part away from silicon atoms, thus developing a tendency to produce ununiform pore sizes in the separation function layer. On the other hand, when the compound (B) having the ethylenically unsaturated group is copolymerized in addition to the increase of the molecular weight and cross-linking of the silicon compound (A) itself, the cross-linking points derived from the condensation of the hydrolyzable group and the cross-linking points derived from the polymerization of the ethylenically unsaturated groups are dispersed moderately. This moderate dispersion of the cross-linking points constitutes a separation function layer which has uniform pore sizes, thereby allowing for a composite semipermeable membrane keeping a balance between water permeability performance and removal performance. In this case, the molecular weight of the compound having one or more ethylenically unsaturated groups needs to be increased, because there is a possibility that the compound will be eluted to cause a decrease in membrane performance when in use for the manufacture of a composite semipermeable membrane, if the compound has a lower molecular weight.

In the manufacturing method according to the present invention, the content of the silicon compound (A) in which the reactive group having the ethylenically unsaturated group and the hydrolyzable group are directly bonded to silicon atoms is preferably 10 parts by weight or more, and more preferably 20 to 50 parts by weight with respect to 100 parts by weight of the solid content contained in the reaction solution. In this case, the solid content contained in the reaction solution refers to a component excluding the solvent and the distilled component among all of the components contained in the reaction solution, which is finally contained as the separation function layer in the composite semipermeable membrane obtained in accordance with the manufacturing method according to the present invention. A small amount of the silicon compound (A) tends to provide an insufficient degree of cross-linking, and there is thus a possibility that problems will be caused such as a decrease in separation performance due to elution of the separation function layer during membrane filtration.

The content of the compound (B) having the ethylenically unsaturated group is preferably 90 parts by weight or less, and more preferably 50 to 80 parts by weight with respect to 100 parts by weight of the solid content contained in the reaction solution. When the content of the compound (B) falls within these ranges, the resulting separation function layer will have a higher degree of cross-linking, and stable membrane filtration can be thus carried out without elution of the separation function layer.

Next, a method for forming the separation function layer on a porous supporting membrane in the method for manufacturing a composite semipermeable membrane according to the present invention will be described.

An example of the method for the formation of the separation function layer includes a step of applying a reaction solution containing the silicon compound (A) and the compound (B) having an ethylenically unsaturated group, a step of removing the solvent, a step of polymerizing the ethylenically unsaturated groups, and a step of condensing the hydrolyzable group, which are carried out in this order. The hydrolyzable group may be condensed at the same time in the step of polymerizing the ethylenically unsaturated groups.

First, the reaction solution containing the silicon compound (A) and the compound (B) is brought into contact with a microporous supporting membrane. The reaction solution is typically a solution containing a solvent, and the solvent is not particularly limited as long as the solvent has no ability to destroy the microporous supporting membrane but dissolves the silicon compound (A) and the compound (B), as well as a polymerization initiator added if necessary. To this reaction solution, water is preferably added along with an inorganic acid or an organic acid, by 1 to 10 times, preferably 1 to 5 times in terms of molar quantity with respect to the mole number of the silicon compound (A) to promote the hydrolysis of the silicon compound (A).

As the solvent of the reaction solution, water, alcohol-based organic solvents, ether-based organic solvents, ketone-based organic solvents, and mixtures thereof are preferable. Examples of the alcohol-based organic solvents include methanol, ethoxy methanol, ethanol, propanol, butanol, amyl alcohol, cyclohexanol, methylcyclohexanol, ethylene glycol monomethyl ether(2-methoxy ethanol), ethylene glycol monoaceto ester, diethylene glycol monomethyl ether, diethylene glycol monoacetate, propylene glycol monoethyl ether, propylene glycol monoacetate, dipropylene glycol monoethyl ether, and methoxy butanol. In addition, examples of the ether-based organic solvents include methylal, diethyl ether, dipropyl ether, dibutyl ether, diamyl ether, diethyl acetal, dihexyl ether, trioxane, and dioxane. In addition, examples of the ketone-based organic solvents include acetone, methyl ethyl ketone, methyl propyl ketone, methyl isobutyl ketone, methyl amyl ketone, methyl cyclohexyl ketone, diethyl ketone, ethyl butyl ketone, trimethyl nonanone, acetonitrile acetone, dimethyloxide, phorone, cyclohexanone, and diacetone alcohol. In addition, the additive amount of the solvent is preferably 50 to 99 parts % by weight, and more preferably 80 to 99 parts % by weight. Too large an additive amount of the solvent tends to cause defects in the membrane, whereas too small an additive amount of the solvent tends to decrease the water permeability of the resulting composite semipermeable membrane.

The contact between the microporous supporting membrane and the reaction solution is preferably made uniformly and continuously on the surface of the microporous supporting membrane. Specifically, for example, there is a method of coating the microporous supporting membrane with the reaction solution with the use of a coating applicator such as a spin coater, a wire bar, a flow coater, a die coater, a roll coater, or a sprayer. In addition, there is also a method of immersing the microporous supporting membrane into the reaction solution.

In the case of immersing the microporous supporting membrane, the duration of contact between the microporous supporting membrane and reaction solution preferably falls within the range of 0.5 to 10 minutes, more preferably within the range of 1 to 3 minutes. After the reaction solution is brought into contact with the microporous supporting membrane, drippings are preferably removed so sufficiently that no droplet is left on the membrane. The sufficient removal of drippings can prevent remaining droplets from leading to membrane defects to decrease the membrane performance after the formation of the membrane. As the method for the removal of drippings, a method of vertically grasping the microporous supporting membrane after coming into contact with the reaction solution to naturally drop the excess reaction solution, a method of blowing wind such as nitrogen from an air nozzle for forcible removal of drippings, etc., can be used. In addition, after the removal of drippings, the surface of the membrane can be dried to partially remove the solvent of the reaction solution.

The step of condensing the hydrolyzable group of the silicon is carried out by a heat treatment after bringing the reaction solution into contact with the microporous supporting membrane. The heating temperature in this case is required to be lower than the temperature at which the microporous supporting membrane is melted to decrease the performance as a separation membrane. In order to progress the condensation reaction rapidly, the heating is preferably carried out typically at 0° C. or more, and more preferably at 20° C. or more. In addition, the reaction temperature mentioned above is preferably 150° C. or less, and more preferably 100° C. or less. A reaction temperature of 0° C. or more progresses the hydrolysis and the condensation reaction rapidly, whereas a reaction temperature of 150° C. or less makes it easier to control the hydrolysis and the condensation reaction. In addition, the addition of a catalyst for promoting the hydrolysis or the condensation allows the reaction to be progressed at lower temperatures. Furthermore, in the present invention, the heating condition and humidity condition are selected to provide the separation function layer with pores, in such a way that the condensation reaction is carried out appropriately.

As a method for the polymerization of the ethylenically unsaturated group of the silicon compound (A) and the ethylenically unsaturated group of the compound (B) having the ethylenically unsaturated group, the polymerization can be carried out by a heat treatment, electromagnetic wave irradiation, electron beam irradiation, and plasma irradiation. The electromagnetic wave herein includes infrared rays, ultraviolet rays, X rays, and γ rays. While an optimum selection of the polymerization method may be made appropriately, polymerization by electromagnetic wave irradiation is preferable in terms of running cost, productivity, etc. Polymerization by infrared ray irradiation or ultraviolet ray irradiation is more preferable among the electromagnetic waves in terms of convenience. In the case of actually carrying out polymerization with the use of infrared rays or ultraviolet rays, these light sources do not have to selectively generate only light rays in these wavelength ranges, and it is enough for the light sources to generate light rays including electromagnetic rays in these wavelength ranges. However, the strength of these electromagnetic waves is preferably higher as compared with electromagnetic waves in other wavelength ranges, in terms of the ability to reduce the polymerization time and control the polymerization conditions.

The electromagnetic waves can be generated from a halogen lamp, a xenon lamp, a UV lamp, an excimer lamp, a metal halide lamp, a rare gas fluorescent lamp, a mercury lamp, etc. While the energy of the electromagnetic waves is not particularly limited as long as polymerization can be carried out, above all, low-wavelength ultraviolet rays with a high degree of efficiency have high thin film forming properties. Such ultraviolet rays can be generated by low pressure mercury lamps and excimer laser lamps. The thickness and form of the separation function layer according to the present invention may vary significantly depending also on the respective polymerization conditions, and may vary significantly depending on the wavelengths and intensity of the electromagnetic waves, the distance to an object to be irradiated, and the processing time, in the case of polymerization with electromagnetic waves. Therefore, these conductions need to be appropriately optimized.

It is preferable to add a polymerization initiator, a polymerization promoter, etc., in the formation of the separation function layer for the purpose of increasing the polymerization rate. The polymerization initiator and the polymerization promoter herein are not particularly limited, and appropriately selected according to the structures of the compounds used, the polymerization approach, etc.

Examples of the polymerization initiator are given below. Examples of the initiator for the polymerization with electromagnetic waves include benzoin ether, dialkyl benzil ketal, dialkoxyacetophenone, acylphosphine oxide or bisacylphosphine oxide, α-diketones (for example, 9,10-phenanthrene quinone), diacetyl quinone, furylquinone, anisyl quinone, 4,4'-dichloro benzylquinone and 4,4'-dialkoxy benzylquinone, and camphor quinone. Examples of the initiator for the polymerization with heat include azo compounds (for example, 2,2'-azobis(isobutyronitrile) (AIBN) or azobis-(4-cyanovalerianic acid)), or peroxides (for example, dibenzoyl peroxide, dilauroyl peroxide, tert-butyl octaneperoxoate, tert-butyl perbenzoate, or di-(tert-butyl)peroxide), further aromatic diazonium salts, bis-sulfonium salts, aromatic iodonium salts, aromatic sulfonium salts, potassium persulfate, ammonium persulfate, alkyl lithium, cumyl potassium, sodium naphthalene, and distyryl dianion. Above all, benzopinacol and 2,2'-dialkylbenzopinacol are particularly preferable as initiators for radical polymerization.

The peroxides and α-diketones are preferably used in combination with an aromatic amine in order to accelerate the initiation. These combinations are also referred to as redox series. An example of these series is a combination of benzoyl peroxide or camphor quinine with an amine (for example, N,N-dimethyl-p-toluidine, N,N-dihydroxyethyl-p-toluidine, p-dimethyl-ethyl aminobenzoate ester, or a derivative thereof). Furthermore, another series are also preferable which contain a peroxide in combination with ascorbic acid, barbiturate, or sulfinic acid as a reducing agent.

Then, a heat treatment at about 100 to 200° C. for on the order of 10 minutes to 3 hours produces a condensation reaction, thereby giving a composite semipermeable membrane according to the present invention including a separation function layer derived from the silicon compound, which is formed on the surface of the microporous supporting membrane. While the heating temperature depends on the material of the microporous supporting membrane, too high a heating temperature causes dissolution to block pores of the microporous supporting membrane, thus decreasing the water desalination amount achieved by the composite semipermeable membrane. On the other hand, too low a heating temperature produces an insufficient condensation reaction to elute the function layer, thereby decreasing the removal rate.

In the manufacturing method described above, the step of providing the silicon compound (A) and the compound (B) having one or more ethylenically unsaturated groups with a higher molecular weight may be carried out before or after the step of condensing the silicon compound. Alternatively, these steps may be carried out at the same time.

While the composite semipermeable membrane thus obtained can be used as it is, the surface of the membrane is preferably provided with hydrophilicity before use with the use of, for example, an alcohol-containing aqueous solution or an alkaline aqueous solution.

EXAMPLES

The present invention will be more specifically described below with reference to examples. However, the present invention is not to be considered limited to these examples.

In the following examples, the removal rate of the composite semipermeable membrane, the permeability rate of the composite semipermeable membrane, and the performance retention rate after immersion in chlorine are calculated by the following equations (b), (c), and (d), respectively.

Removal Rate (%)={(Concentration of Supplied Solution−Concentration of Permeated Solution)/Concentration of Supplied Solution}×100    Equation (b)

Permeability Rate ($m^3/m^2$/day)=(Amount of Permeated Solution per Day)/(Area of Membrane)    Equation (c)

Performance Retention Rate after Immersion in Chlorine (%)=(Removal Rate after Immersion in Chlorine)/(Removal Rate before Immersion in Chlorine)×100    Equation (d)

In addition, the pore size of the microporous supporting membrane in its surface was calculated from an electron micrograph observed at 60,000-fold magnification.

Example 1

A 15.7 weight % solution of polysulfone in dimethylformamide was cast onto a polyester nonwoven fabric at room temperature (25° C.) to have a thickness of 200 μm, and immediately immersed in pure water and left for 5 minutes to manufacture a microporous supporting membrane. The surface of the thus obtained microporous supporting membrane had a pore size of 21 nm, and the microporous supporting membrane had a thickness of 150 μm.

The obtained microporous supporting membrane was brought into contact with an isopropyl alcohol solution containing 0.8 weight % of 3-acryloxypropyltrimethoxy silane corresponding to the compound (A), 3.2 weight % of sodium 4-vinyl phenyl sulfonate corresponding to the compound (B), 0.24 weight % of 2,2-dimethoxy-2-phenylacetophenone, and 33.5 weight % of pure water for 1 minute, and nitrogen was blown from an air nozzle to remove the extra solution from the surface of the supporting membrane, thereby forming a layer of the solution on the microporous supporting membrane. Then, with the use of an excimer lamp (UER 20-172) produced by Ushio, Inc., capable of irradiation with ultraviolet rays with a wavelength of 172 nm, the distance between the lamp and the microporous supporting membrane was set to 1 cm under a nitrogen atmosphere with an oxygen concentration of 0.1% or less, and irradiation with ultraviolet rays was carried out for 5 minutes to produce a composite semipermeable membrane with a separation function layer formed on the surface of the microporous supporting membrane, which is formed from 3-acryloxypropyltrimethoxy silane and sodium 4-vinyl phenyl sulfonate.

Next, the obtained composite semipermeable membrane was held in a hot air drying machine at 100° C. for 2 hours to condense 3-acryloxypropyltrimethoxy silane, thereby providing a dried composite semipermeable membrane with the separation function layer on the microporous supporting membrane. After that, the dried composite semipermeable membrane was immersed in a 10 weight % aqueous isopropyl alcohol solution for 10 minutes to provide the membrane with hydrophilicity. To the thus obtained composite semipermeable membrane, a 500 ppm salt solution adjusted to pH 6.5 was supplied under the conditions of 0.5 MPa and 25° C. to carry out the operation of membrane filtration under pressure in which the permeated water and the supplied water were measured for water quality, thereby obtaining the results shown in Table 1. In addition, the thickness of the separation function layer obtained in this case was 180 nm on average, which was measured from a cross-sectional image of the membrane observed by a field-emission-type scanning electron microscope (FE-SEM).

Example 2

A composite semipermeable membrane was manufactured in the same way as in Example 1, except that 3-acryloxypropyltrimethoxy silane used in Example 1 was replaced with 3-methacryloxypropyltrimethoxy silane. The separation function layer had a thickness of 230 nm on average. The obtained composite semipermeable membrane was evaluated in the same way as in Example 1 to obtain the results shown in Table 1.

Example 3

A composite semipermeable membrane was manufactured in the same way as in Example 1, except that 3-acryloxypropyltrimethoxy silane used in Example 1 was replaced with p-styryltrimethoxy silane. The separation function layer had a thickness of 240 nm on average. The obtained composite semipermeable membrane was evaluated in the same way as in Example 1 to obtain the results shown in Table 1.

Example 4

A composite semipermeable membrane was manufactured in the same way as in Example 1, except that the reaction solution in Example 1 was replaced with an isopropyl alcohol solution containing 2 weight % of 3-acryloxypropyltrimethoxy silane corresponding to the compound (A), 2 weight % of potassium 4-vinyl phenyl sulfonate corresponding to the compound (B), 0.24 weight % of 2,2-dimethoxy-2-phenylacetophenone, and 33.5 weight % of pure water. The separation function layer had a thickness of 300 nm on average. The obtained composite semipermeable membrane was evaluated in the same way as in Example 1 to obtain the results shown in Table 1.

Example 5

The concentration of the DMF solution of polysulfone in Example 1 was changed to 18 weight % to manufacture and obtain a polysulfone microporous supporting membrane with a pore size of 16.4 nm in the obtained surface and a total thickness of 224 to 229 μm. After that, a separation function layer was provided in the same way as in Example 1 to manufacture a composite semipermeable membrane. The separation function layer had a thickness of 200 nm on average. The obtained composite semipermeable membrane was evaluated in the same way as in Example 1 to obtain the results shown in Table 1.

Example 6

The concentration of the DMF solution of polysulfone in Example 1 was changed to 25 weight % to manufacture and obtain a polysulfone microporous supporting membrane with a pore size of 13.1 nm and a total thickness of 232 to 237 μm. After that, a separation function layer was provided in the same way as in Example 1 to manufacture a composite semipermeable membrane. The separation function layer had a thickness of 250 nm on average. The obtained composite semipermeable membrane was evaluated in the same way as in Example 1 to obtain the results shown in Table 1.

Comparative Example 1

An aqueous solution containing 3.0 weight % of meta-phenylene diamine and 0.5 weight % of sodium hydrogen sulfite was applied to the same microporous supporting membrane as in Example 1, and dried with hot air at 70° C. for 1 minute. After that, an n-decane solution containing 0.4 weight % of isophthalic acid chloride and 0.1 weight % of trimesic acid trichloride was applied, and treated with hot air at 100° C. for 5 minutes. After that, the microporous supporting membrane was further immersed in a 100 ppm aqueous chlorine solution adjusted to pH 7 for 2 minutes, and then washed with pure water, thereby resulting in a composite semipermeable membrane provided with a separation function layer composed of a polyamide. The obtained composite semipermeable membrane was evaluated in the same way as in Example 1 to obtain the results shown in Table 1.

Comparative Example 2

A composite semipermeable membrane was manufactured in the same way as in Example 1, except that the reaction solution in Example 1 contained therein no 3-methacryloxypropyltrimethoxy silane and the content of sodium 4-vinyl phenyl sulfonate was changed to 4 weight %. The obtained composite semipermeable membrane was evaluated in the same way as in Example 1 to obtain the results shown in Table 1. The initial performance of the composite semipermeable membrane obtained according to Comparative Example 2 had a significantly low salt rejection rate, as compared with the composite semipermeable membranes obtained according to Examples 1 to 6.

The composite semipermeable membranes obtained according to each of Examples 1 to 6 and Comparative Examples 1 to 2 were immersed in a 500 ppm aqueous chlorine solution adjusted to pH 7 for 1 week to carry out a chlorine resistance test. The performance retention rates after the immersion in the aqueous chlorine solution are shown in Table 1.

Comparative Example 3

A composite semipermeable membrane was manufactured in the same way as in Example 1, except that 3-acryloxypropyltrimethoxy silane was replaced with 3-chloropropyltrimethoxy silane having no ethylenically unsaturated group. The thus obtained composite semipermeable membrane was evaluated in the same way as in Example 1 to result in a removal rate of 13% and a permeability rate of 11 m³/m²/day, which means that the removal rate was significantly decreased.

Comparative Example 4

A composite semipermeable membrane was obtained in the same way as in Example 1 by using an isopropyl alcohol solution containing 4 weight % of 3-methacryloxypropyltrimethoxy silane and 33.6 weight % of pure water as the reaction solution. However, no ultraviolet irradiation was carried out. While the obtained composite semipermeable membrane was evaluated in the same way as in Example 1, the composite semipermeable membrane exhibited no water permeability at all, and neither the removal rate nor permeability rate was able to be measured.

TABLE 1

| | Initial Performance | | Performance Retention Rate (%) after Immersion in Aqueous Chlorine Solution |
|---|---|---|---|
| | Removal Rate (%) | Permeability Rate (m³/m²/day) | |
| Example 1 | 78.9 | 1.89 | 106 |
| Example 2 | 75.4 | 1.51 | 98 |
| Example 3 | 76.4 | 1.40 | 102 |
| Example 4 | 92.6 | 0.53 | 96 |
| Example 5 | 80.1 | 1.42 | 100 |
| Example 6 | 77.9 | 0.92 | 103 |
| Comparative Example 1 | 93.2 | 0.83 | 55 |
| Comparative Example 2 | 8.9 | 10.1 | — |

From Table 1, it is determined that the composite semipermeable membrane obtained according to Comparative Example 2 exhibits a significantly decreased performance retention rate after the immersion in the aqueous chlorine solution, whereas the composite semipermeable membranes obtained according to Examples 1 to 6 keep the performance comparable to that before the immersion, even after the immersion in the aqueous chlorine solution. Accordingly, it is determined that the composite semipermeable membranes obtained in accordance with the manufacturing method according to present invention have excellent chlorine resistance.

INDUSTRIAL APPLICABILITY

The composite semipermeable membrane of the present invention can be used in the fields of water treatment, such as solid-liquid separation, liquid separation, filtration, purification, concentration, sludge disposal, seawater desalination, drinking water production, pure water production, discharged water recycle, volume reduction of discharged water, and valuable resource collection. As a result, improvements such as energy saving and reduction in running cost are expected in addition to provision of high-performance membranes.

The invention claimed is:

1. A composite semipermeable membrane comprising a separation function layer formed on a microporous supporting membrane, wherein the separation function layer is formed from:
   (A) a silicon compound in which reactive groups having an ethylenically unsaturated group and a hydrolyzable group are directly bonded to silicon atoms, and
   (B) a compound that does not contain silicon having an ethylenically unsaturated group and a phosphonic, phosphoric or sulfonic acid group in the form of an acid, ester, metal salt or anhydride, or a carboxylic group in the form of an acid, metal salt or anhydride,
   and wherein the hydrolyzable group of the silicon compound (A) undergoes condensation, and the ethylenically unsaturated group of the silicon compound (A) and the ethylenically unsaturated group of the compound (B) undergo polymerization.

2. The composite semipermeable membrane according to claim 1, wherein the microporous supporting membrane has an average pore size of 1 to 100 nm.

3. The composite semipermeable membrane according to claim 1, wherein the hydrolyzable group of the silicon compound (A) is an alkoxy group, an alkenyloxy group, a carboxy group, a ketoxime group, a halogen atom, or an isocyanate group.

4. The composite semipermeable membrane according to claim 1, wherein the silicon compound (A) is represented by the following general formula (a):

$$Si(R^1)_m(R^2)_n(R^3)_{4-m-n}$$   General Formula (a)

wherein $R^1$ represents a reactive group including an ethylenically unsaturated group; $R^2$ is an alkoxy group, an alkenyloxy group, a carboxy group, a ketoxime group, a halogen atom, or an isocyanate group; $R^3$ represents a hydrogen atom or an alkyl group; m and n are integers, and $m+n\leq4$, $m\geq1$, and $n\geq1$; and when two or more functional groups in each of $R^1$, $R^2$, and $R^3$ are bonded to a silicon atom, $R^1$, $R^2$, and $R^3$ may be the same or different.

5. The composite semipermeable membrane according to claim 4, wherein the compound (B) is selected from the group consisting of maleic acid, maleic anhydride, acrylic acid, methacrylic acid, 2-(hydroxymethyl)acrylic acid, 4-(meth)acryloyloxyethyl mellitic acid and corresponding anhydrides, 10-methacryloyloxydecyl malonic acid, N-(2-hydroxy-3-methacryloyloxypropyl)-N-phenylglycine, 4-vinyl benzoic acid, vinylphosphonic acid, 4-vinylphenylphosphonic acid, 4-vinylbenzylphosphonic acid, 2-methacryloyloxyethylphosphonic acid, 2-methacrylamideethyl phosphonic acid, 4-methacrylamide-4-methyl-phenyl-phosphonic acid, 2-[4-(dihydroxyphosphoryl)-2-oxa-butyl]-acrylic acid, 2-methacryloyloxypropyl hydrogenphosphate, 2-methacryloyloxypropyl dihydrogenphosphate, 2-methacryloyloxyethyl hydrogenphosphate, 2-methacryloyloxyethyl dihydrogenphosphate, 2-methacryloyloxyethyl-phenyl-hydrogenphosphate, dipentaerythritol-pentamethacryloyloxyphosphate, 10-methacryloyloxydecyl-dihydrogenphosphate, dipentaerythritol pentamethacryloyloxyphosphate, phosphoric acid mono-(1-acryloyl-piperidine-4-yl)-ester, 6-(methacrylamide)hexyl dihydrogenphosphate, 1,3-bis-(N-acryloyl-N-propyl-amino)-propane-2-yl-dihydrogenphosphate, vinyl sulfonic acid, 4-vinylphenyl sulfonic acid, and 3-(methacrylamide) propyl sulfonic acid.

6. The composite semipermeable membrane according to claim 5, wherein the microporous supporting membrane has an average pore size of 1 to 100 nm.

7. The composite semipermeable membrane according to claim 1, wherein the compound (B) is selected from the group consisting of maleic acid, maleic anhydride, acrylic acid, methacrylic acid, 2-(hydroxymethyl)acrylic acid, 4-(meth)acryloyloxyethyl mellitic acid and corresponding anhydrides, 10-methacryloyloxydecyl malonic acid, N-(2-hydroxy-3-methacryloyloxypropyl)-N-phenylglycine, 4-vinyl benzoic acid, vinylphosphonic acid, 4-vinylphenylphosphonic acid, 4-vinylbenzylphosphonic acid, 2-methacryloyloxyethylphosphonic acid, 2-methacrylamideethyl phosphonic acid, 4-methacrylamide-4-methyl-phenyl-phosphonic acid, 2-[4-(dihydroxyphosphoryl)-2-oxa-butyl]-acrylic acid, 2-methacryloyloxypropyl hydrogenphosphate, 2-methacryloyloxypropyl dihydrogenphosphate, 2-methacryloyloxyethyl hydrogenphosphate, 2-methacryloyloxyethyl dihydrogenphosphate, 2-methacryloyloxyethyl-phenyl-hydrogenphosphate, dipentaerythritol-pentamethacryloyloxyphosphate, 10-methacryloyloxydecyl-dihydrogenphosphate, dipentaerythritol pentamethacryloyloxyphosphate, phosphoric acid mono-(1-acryloyl-piperidine-4-yl)-ester, 6-(methacrylamide)hexyl dihydrogenphosphate, 1,3-bis-(N-acryloyl-N-propyl-amino)-propane-2-yl-dihydrogenphosphate, vinyl sulfonic acid, 4-vinylphenyl sulfonic acid, and 3-(methacrylamide) propyl sulfonic acid.

8. A method for manufacturing a composite semipermeable membrane with a separation function layer formed on a microporous supporting membrane, wherein the separation function layer is formed by
obtaining (A) a silicon compound in which reactive groups having an ethylenically unsaturated group and a hydrolyzable group are directly bonded to silicon atoms, and (B) a compound that does not contain silicon having an ethylenically unsaturated group and a phosphonic, phosphoric or sulfonic acid group in the form of an acid, ester, metal salt or anhydride, or a carboxylic group in the form of an acid, metal salt or anhydride;
condensing the hydrolyzable group of the silicon compound (A); and
polymerizing the ethylenically unsaturated group of the silicon compound (A) and the ethylenically unsaturated group of the compound (B).

\* \* \* \* \*